US012589509B2

(12) United States Patent
Yoshimura et al.

(10) Patent No.: US 12,589,509 B2
(45) Date of Patent: Mar. 31, 2026

(54) VACUUM SUCTION CYLINDER ASSEMBLY

(71) Applicant: SMC CORPORATION, Chiyoda-ku (JP)

(72) Inventors: Shinichi Yoshimura, Moriya (JP); Minehiko Mita, Joso (JP); Masaki Morimoto, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 969 days.

(21) Appl. No.: 17/782,932

(22) PCT Filed: Sep. 24, 2020

(86) PCT No.: PCT/JP2020/035964
§ 371 (c)(1),
(2) Date: Jun. 6, 2022

(87) PCT Pub. No.: WO2021/111709
PCT Pub. Date: Jun. 10, 2021

(65) Prior Publication Data
US 2023/0017482 A1 Jan. 19, 2023

(30) Foreign Application Priority Data
Dec. 6, 2019 (JP) ................................. 2019-220816

(51) Int. Cl.
*B25J 15/06* (2006.01)
(52) U.S. Cl.
CPC ................................. *B25J 15/0625* (2013.01)

(58) Field of Classification Search
CPC . B25J 15/0625; B25J 15/0675; B25J 15/0061
See application file for complete search history.

(56) References Cited

U.S. PATENT DOCUMENTS

| | | | | |
|---|---|---|---|---|
| 5,244,242 A | * | 9/1993 | Goedecke | F04F 5/52 |
| | | | | 294/185 |
| 6,328,362 B1 | * | 12/2001 | Isogai | H05K 13/0409 |
| | | | | 294/185 |
| 10,351,357 B1 | * | 7/2019 | Grovijohn | B25J 15/0616 |

(Continued)

FOREIGN PATENT DOCUMENTS

| | | |
|---|---|---|
| JP | 3-42433 A | 2/1991 |
| JP | 4-343692 A | 11/1992 |
| JP | 2000-165094 A | 6/2000 |

(Continued)

OTHER PUBLICATIONS

International Search Report mailed on Nov. 10, 2020 in PCT/JP2020/035964 filed on Sep. 24, 2020 (3 pages).

(Continued)

*Primary Examiner* — Stephen A Vu
(74) *Attorney, Agent, or Firm* — Oblon, McClelland, Maier & Neustadt, L.L.P.

(57) ABSTRACT

A plurality of vacuum suction cylinders are connected to each other by using tie rods inserted into insertion holes penetrating side walls of a cylinder tube of each vacuum suction cylinder, insertion holes provided in a first flow path block, and insertion holes provided in a second flow path block, and sandwiching between the first flow path block and the second flow path block.

9 Claims, 7 Drawing Sheets

(56)            References Cited

U.S. PATENT DOCUMENTS

| | | | | |
|---|---|---|---|---|
| 11,253,995 B2 * | 2/2022 | Odell | ................... | B25J 9/1035 |
| 2010/0148101 A1 * | 6/2010 | Narita | ................ | F15B 13/0839 |
| | | | | 251/129.01 |

FOREIGN PATENT DOCUMENTS

| | | | |
|---|---|---|---|
| JP | 2001-47385 | A | 2/2001 |
| JP | 2010-144802 | A | 7/2010 |
| JP | 2015-43373 | A | 3/2015 |
| TW | I534064 | B | 5/2016 |

OTHER PUBLICATIONS

Taiwanese Office Action dated Jun. 30, 2021 in TW Application No. 109140975, 16 pages (with computer-generated English Translation).

Office Action issued Mar. 16, 2024, in corresponding Korean Patent Application No. 10-2022-7021906 (with English Translation), 9 pages.

* cited by examiner

VACUUM SUCTION CYLINDER ASSEMBLY

TECHNICAL FIELD

The present invention relates to a vacuum suction cylinder assembly in which a plurality of vacuum suction cylinders are connected to each other.

BACKGROUND ART

For an apparatus for sucking and conveying an electronic component or the like, there is known a technique in which a suction tool is provided at a distal end of a piston rod that moves up and down by a cylinder, and vacuum is supplied to the suction tool.

For example, JP 2000-165094 A discloses a suction conveyance assembly. The suction conveyance assembly includes a pneumatic cylinder in which a hollow piston rod having a vacuum guide passage communicating with a suction tool provided at the tip thereof reciprocates, an air supply block attached to the pneumatic cylinder, and a vacuum generation block. It also describes the stacking of the suction conveyance assemblies.

However, in the case where a plurality of independently controllable vacuum suction cylinders are connected, sufficient consideration has not been given to facilitating handling such as addition and removal of the vacuum suction cylinders. Further, also from the viewpoint of improving responsiveness by, for example, reducing the flow rate necessary for the operation of each vacuum suction cylinder, sufficient consideration has not been given.

SUMMARY OF THE INVENTION

The present invention has been made in view of such circumstances, and has the object of providing a vacuum suction cylinder assembly which is easy to handle. Further, the present invention has the object of providing a vacuum suction cylinder assembly having good responsiveness with respect to the operation of each vacuum suction cylinder.

A vacuum suction cylinder assembly according to the present invention comprises a plurality of vacuum suction cylinders connected in a predetermined direction, wherein the plurality of vacuum suction cylinders are connected to each other by being sandwiched between a first flow path block and a second flow path block by using tie rods respectively inserted through insertion holes penetrating a side wall of a cylinder tube of each of the vacuum suction cylinders, insertion holes provided in the first flow path block, and insertion holes provided in the second flow path block.

According to the above-described vacuum suction cylinder assembly, the plurality of vacuum suction cylinders can be easily connected to each other, and a request to increase or decrease the number of vacuum suction cylinders can be easily accommodated. In addition, air can be rapidly supplied to and discharged from each vacuum suction cylinder.

In the vacuum suction cylinder assembly according to the present invention, the plurality of vacuum suction cylinders are sandwiched between the first flow path block and the second flow path block by using the tie rods inserted through the cylinder tube of each vacuum suction cylinder, the first flow path block, and the second flow path block. Therefore, the plurality of vacuum suction cylinders can be easily connected to each other, and a request to increase or decrease the number of vacuum suction cylinders can be easily accommodated. In addition, since the flow path blocks are disposed on both sides of the plurality of vacuum suction cylinders, air can be rapidly supplied to and discharged from each vacuum suction cylinder, thereby improving responsiveness.

BRIEF DESCRIPTION OF THE DRAWINGS

Figure 2:
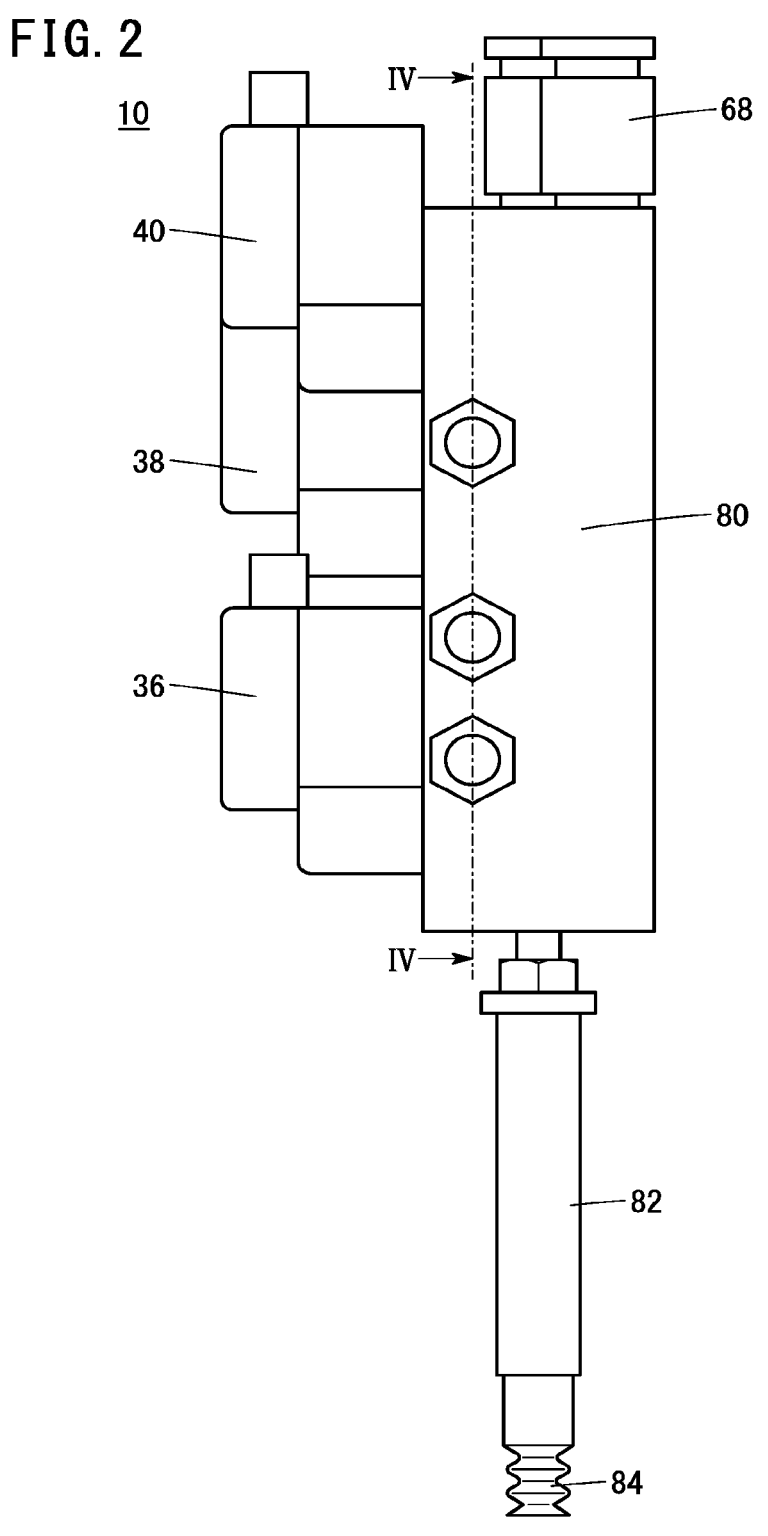

FIG. 2 is a side view of the vacuum suction cylinder assembly shown in FIG. 1;

FIG. 7 is a diagram showing a modification of the vacuum suction cylinder in the vacuum suction cylinder assembly shown in FIG. 1, and corresponds to FIG. 3.

DESCRIPTION OF THE INVENTION

Figure 1:
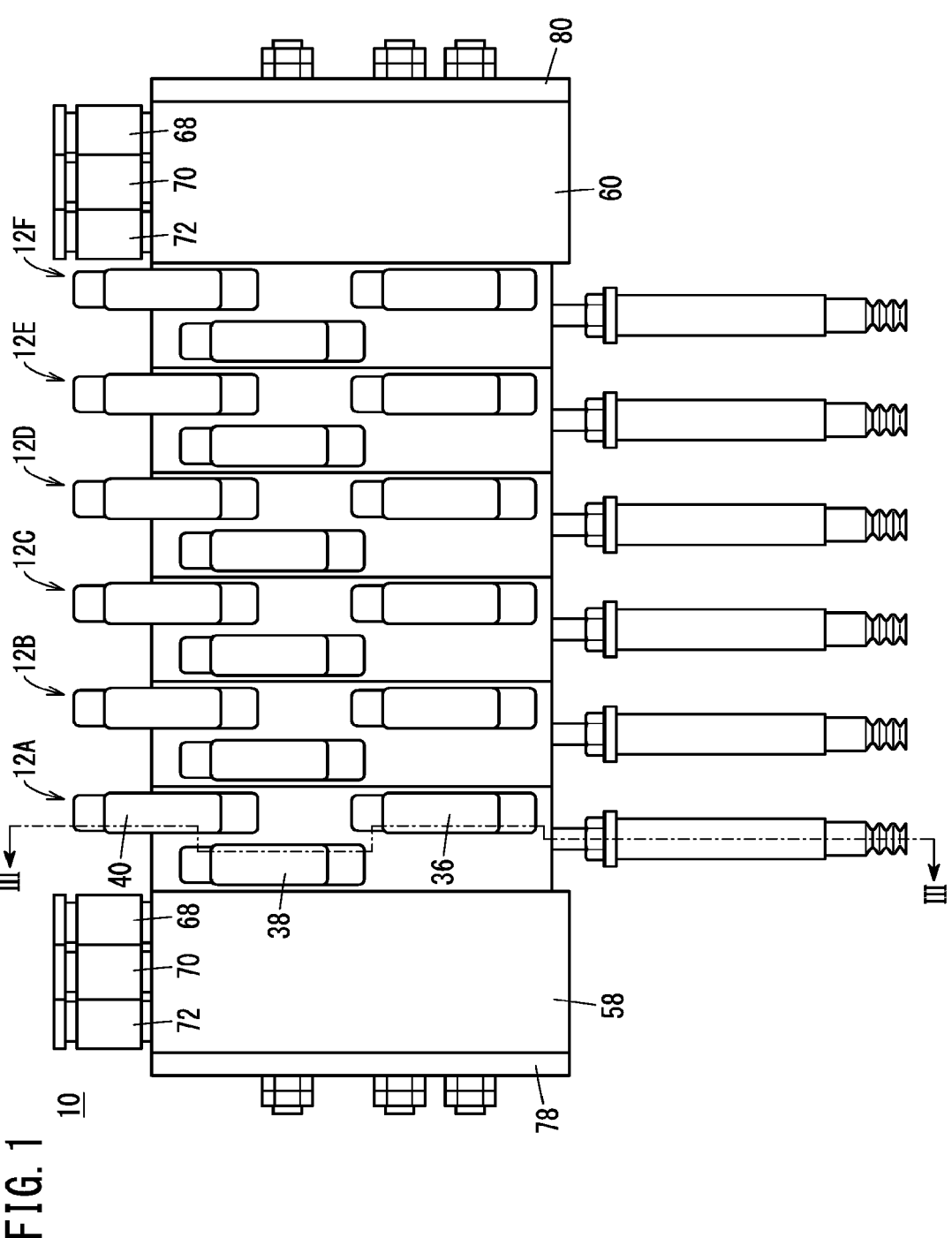
FIG. 1 is a front view of a vacuum suction cylinder assembly according to an embodiment of the present invention.

Preferred embodiments of the basic structure of a vacuum suction cylinder assembly according to the present invention will be described below with reference to the accompanying drawings. In the following description, when the terms in relation to the up, down, left, and right directions are used, for the sake of convenience, such terms refer to the directions shown in the drawings, however, the actual arrangement of the respective component members is not necessarily limited to this feature.

As shown in FIG. 1, a vacuum suction cylinder assembly 10 is formed by connecting a plurality of vacuum suction cylinders 12A to 12F in a lateral direction, is attached to the tip of a robot arm, and is used to pick up, for example, tablets and convey them to a packing position.

The plurality of vacuum suction cylinders 12A to 12F are disposed between a first flow path block 58 and a second flow path block 60. In the present embodiment, a total of six vacuum suction cylinders 12A to 12F are disposed. Since the vacuum suction cylinders 12A to 12F have the same structure, the vacuum suction cylinder 12A adjacent to the first flow path block 58 will be described below as a representative thereof.

Figure 3:
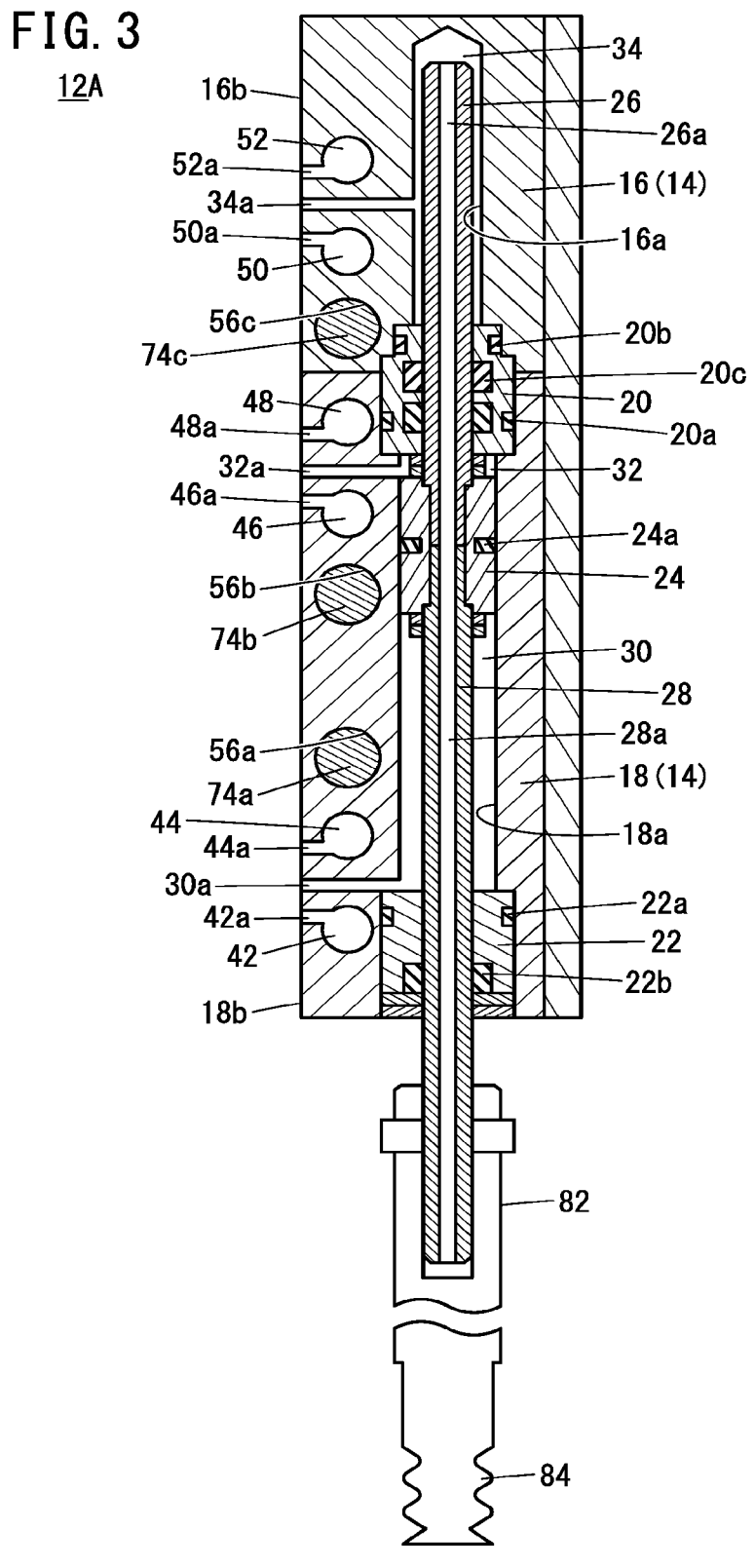
FIG. 3 is a cross-sectional view including a cross section taken along line III-III of the vacuum suction cylinder assembly shown in FIG. 1.

As shown in FIG. 3, the vacuum suction cylinder 12A includes: a cylinder portion including a cylinder tube 14 and a piston 24; an ejector portion including an ejector body 82 and a suction pad 84; and a solenoid valve portion.

The cylinder tube 14 having a quadrangular prism shape is divided into an upper cylinder tube 16 and a lower cylinder tube 18. An intermediate cover body 20 is provided between the lower end portion of the upper cylinder tube 16 and the upper end portion of the lower cylinder tube 18, and an end cover body 22 is attached to the lower end portion of the lower cylinder tube 18.

The piston 24 is slidably provided inside the lower cylinder tube 18. The lower end portion of an upper rod 26 and the upper end portion of a lower rod 28 are inserted through and fixed to the center of the piston 24 so as to abut against each other in the axial direction. The upper rod 26 has an upper rod hole 26a penetrating in the axial direction thereof, and the lower rod 28 has a lower rod hole 28a penetrating in the axial direction thereof. The upper rod hole 26a and the lower rod hole 28a communicate with each other to form a passage for air to be supplied to the ejector portion.

The upper rod 26 extends upward from the piston 24, is inserted through the intermediate cover body 20, and further extends into the upper cylinder tube 16. The lower rod 28 extends downward from the piston 24, is inserted through the end cover body 22, and further extends to the outside. The ejector body 82 is connected, by screwing, to the end portion of the lower rod 28 that extends to the outside. A pair of rod packings 20c in sliding contact with the upper rod 26 are attached to the intermediate cover body 20. A rod packing 22b in sliding contact with the lower rod 28 is attached to the end cover body 22.

A cylinder hole 18a provided inside the lower cylinder tube 18 is partitioned into a lower first pressure chamber 30 and an upper second pressure chamber 32 by the piston 24. A piston packing 24a in sliding contact with the cylinder hole 18a is mounted on the outer periphery of the piston 24. The side wall of the lower cylinder tube 18 includes a first passage 30a communicating with the first pressure chamber 30, and a second passage 32a communicating with the second pressure chamber 32. The first passage 30a and the second passage 32a extend in a direction perpendicular to the longitudinal direction of the lower cylinder tube 18, and are open to one side surface 18b of the lower cylinder tube 18.

The upper rod 26 is housed in a cylinder hole 16a provided inside the upper cylinder tube 16. A third pressure chamber 34 communicating with the upper rod hole 26a is formed between the wall surface of the cylinder hole 16a and the outer periphery of the upper rod 26. The third pressure chamber 34 communicates with the interior of the ejector body 82 through the upper rod hole 26a and the lower rod hole 28a.

A seal ring 22a for sealing the first pressure chamber 30 from the outside is attached to the end cover body 22. A seal ring 20a for sealing the second pressure chamber 32 from the outside and a seal ring 20b for sealing the third pressure chamber 34 from the outside are attached to the intermediate cover body 20.

The side wall of the upper cylinder tube 16 includes a third passage 34a communicating with the third pressure chamber 34. The third passage 34a extends in a direction perpendicular to the longitudinal direction of the upper cylinder tube 16, and is open to one side surface 16b of the upper cylinder tube 16. The side surface 16b of the upper cylinder tube 16 to which the third passage 34a is open is a side surface that matches the side surface 18b of the lower cylinder tube 18 to which the first passage 30a and the second passage 32a are open, and both side surfaces are flush with each other.

As shown in FIG. 1, the solenoid valve portion is formed of a first cylinder solenoid valve 36, a second cylinder solenoid valve 38, and an ejector solenoid valve 40. The first cylinder solenoid valve 36 is provided for switching between supply and discharge of air to and from the first pressure chamber 30. The second cylinder solenoid valve 38 is provided for switching between supply and discharge of air to and from the second pressure chamber 32. The ejector solenoid valve 40 is provided for switching between supply and discharge of air to and from the third pressure chamber 34.

The first cylinder solenoid valve 36 covers the opening of the first passage 30a and is attached to the side surface 18b of the lower cylinder tube 18. The second cylinder solenoid valve 38 covers the opening of the second passage 32a and is attached across the side surface 18b of the lower cylinder tube 18 and the side surface 16b of the upper cylinder tube 16. The ejector solenoid valve 40 covers the opening of the third passage 34a and is attached to the side surface 16b of the upper cylinder tube 16.

The first passage 30a is connected to the first cylinder solenoid valve 36. The second passage 32a is connected to the second cylinder solenoid valve 38. The third passage 34a is connected to the ejector solenoid valve 40.

Figure 4:
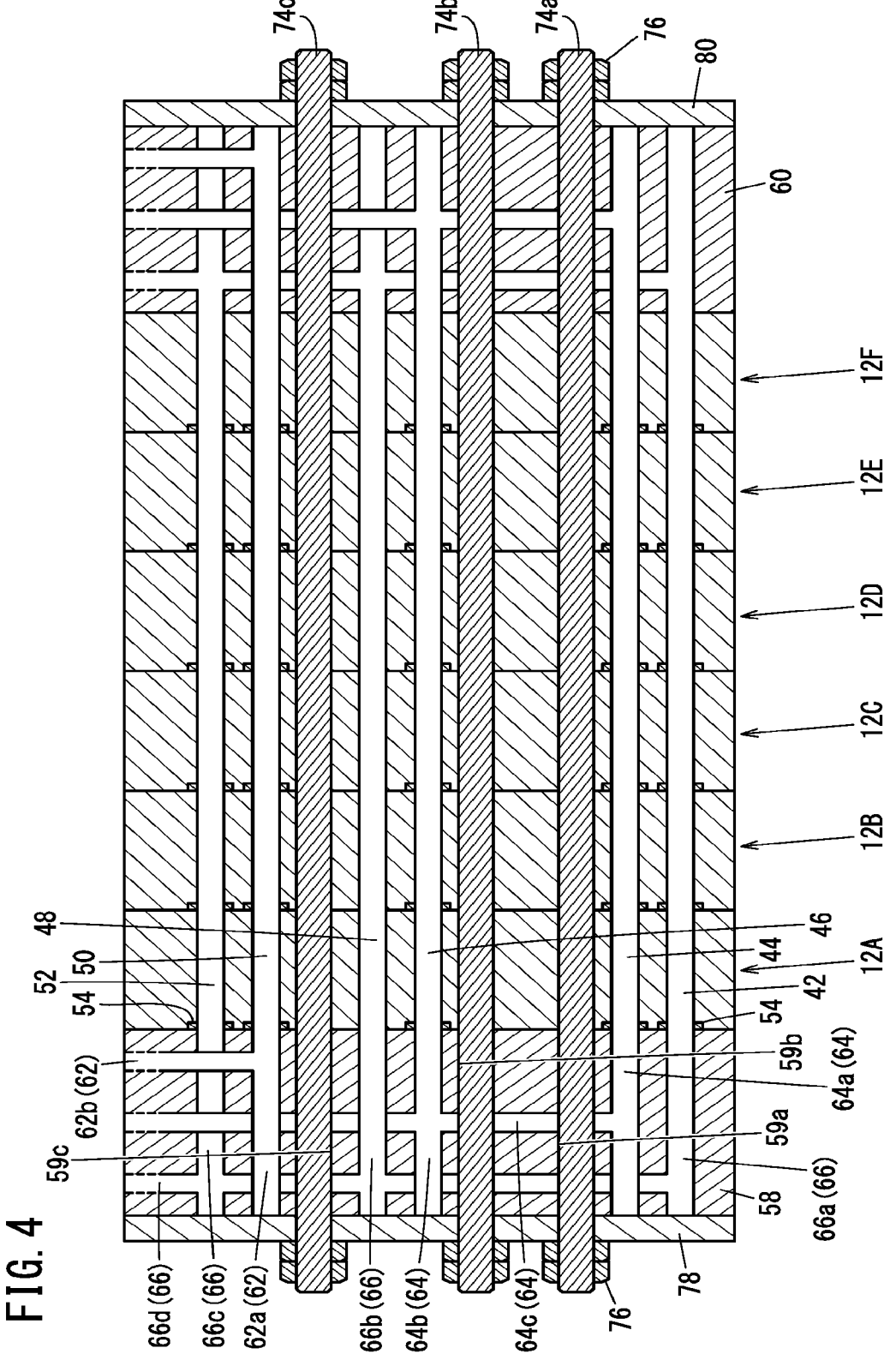
FIG. 4 is a cross-sectional view taken along line IV-IV of the vacuum suction cylinder assembly shown in FIG. 2.

As shown in FIGS. 3 and 4, the side wall that constitutes the side surface 18b of the lower cylinder tube 18 includes, in order from the bottom, a first transverse exhaust passage 42 for cylinder, a first transverse supply passage 44 for cylinder, a second transverse supply passage 46 for cylinder, and a second transverse exhaust passage 48 for cylinder. The supply passages 44, 46 and the exhaust passages 42, 48 penetrate across the side wall of the lower cylinder tube 18, and both ends of each passage are open to the outside. A seal ring 54 is attached via a groove portion to the opening portion located on the left side among the opening portions at both ends (see FIG. 4). Note that FIG. 3 is a cross-sectional view including a cross-section taken along line III-III in FIG. 1, which passes through the solenoid valves 36, 38, 40 and bends, but for the sake of convenience, the cross-section of each of the solenoid valves 36, 38, 40 is omitted.

The first transverse exhaust passage 42 for cylinder is disposed below the first passage 30a, and the first transverse supply passage 44 for cylinder is disposed above the first passage 30a. The first transverse exhaust passage 42 for cylinder is connected to the first cylinder solenoid valve 36 via a first branch passage 42a that is open to the side surface 18b of the lower cylinder tube 18. The first transverse supply passage 44 for cylinder is connected to the first cylinder solenoid valve 36 via a second branch passage 44a that is open to the side surface 18b of the lower cylinder tube 18.

Further, the second transverse supply passage 46 for cylinder is disposed below the second passage 32a, and the second transverse exhaust passage 48 for cylinder is disposed above the second passage 32a. The second transverse supply passage 46 for cylinder is connected to the second cylinder solenoid valve 38 via a third branch passage 46a that is open to the side surface 18b of the lower cylinder tube 18. The second transverse exhaust passage 48 for cylinder is connected to the second cylinder solenoid valve 38 via a fourth branch passage 48a that is open to the side surface 18b of the lower cylinder tube 18.

The side wall that constitutes the side surface 16b of the upper cylinder tube 16 includes a transverse supply passage 50 for ejector and a transverse exhaust passage 52 for ejector. The transverse supply passage 50 for ejector and the transverse exhaust passage 52 for ejector penetrate across the side wall of the upper cylinder tube 16, and both ends of each passage are open to the outside. The seal ring 54 is attached via a groove portion to the opening portion located on the left side among the opening portions at both ends (see FIG. 4).

The transverse supply passage 50 for ejector is disposed below the third passage 34a, and the transverse exhaust passage 52 for ejector is disposed above the third passage 34a. The transverse supply passage 50 for ejector is connected to the ejector solenoid valve 40 via a fifth branch passage 50a that is open to the side surface 16b of the upper cylinder tube 16. The transverse exhaust passage 52 for ejector is connected to the ejector solenoid valve 40 via a sixth branch passage 52a that is open to the side surface 16b of the upper cylinder tube 16.

The first transverse exhaust passage 42 for cylinder, the first transverse supply passage 44 for cylinder, the second transverse supply passage 46 for cylinder, the second transverse exhaust passage 48 for cylinder, the transverse supply passage 50 for ejector, and the transverse exhaust passage 52 for ejector extend in a direction perpendicular to the longitudinal direction of the cylinder tube 14, and are arranged parallel to each other in the up-down direction (direction parallel to the axis of the cylinder tube 14).

Figure 5:
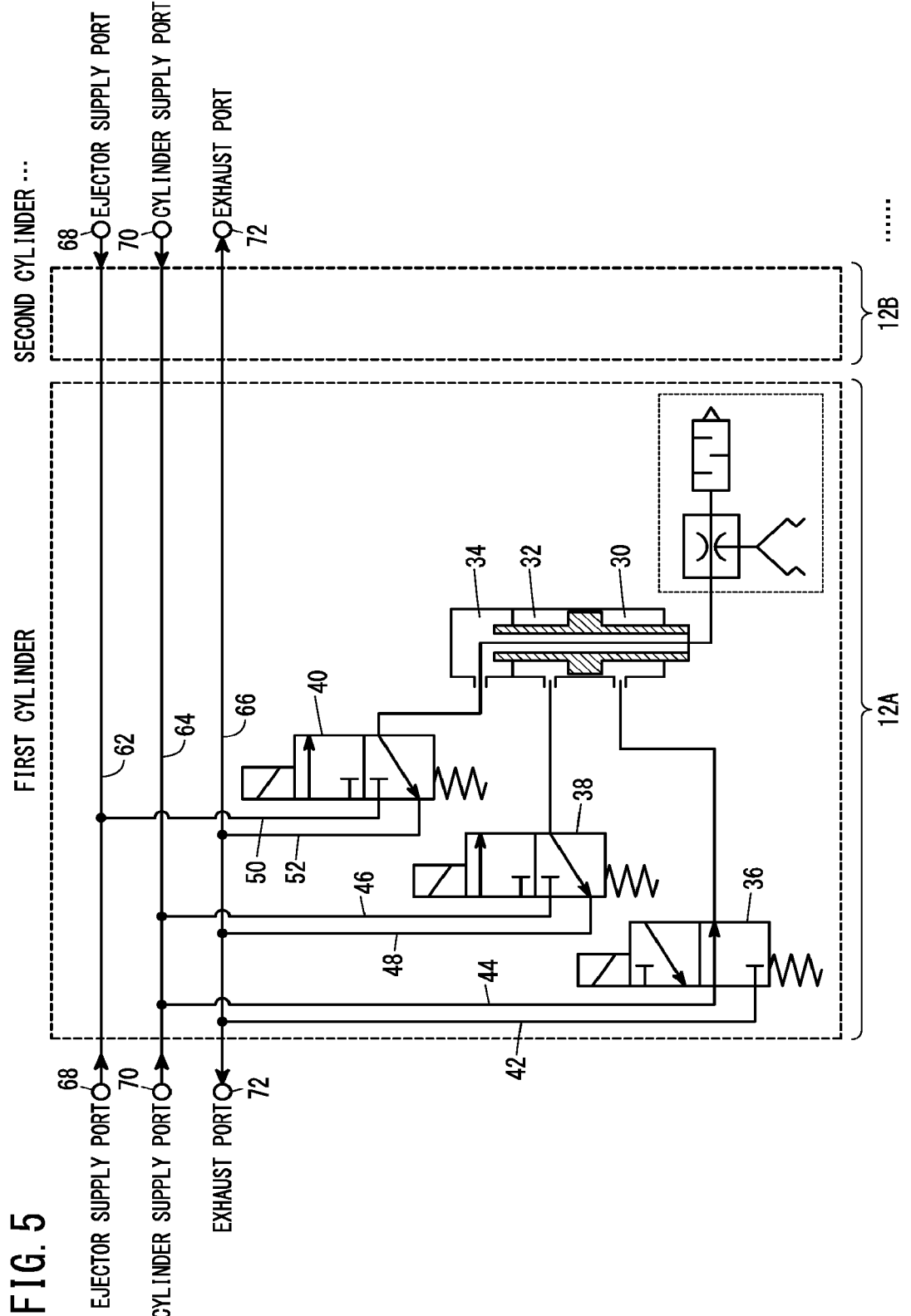
FIG. 5 is a fluid circuit diagram for explaining the operation of the vacuum suction cylinder assembly shown in FIG. 1.

As shown in FIG. 5, the first cylinder solenoid valve 36 connects the first pressure chamber 30 to the first transverse exhaust passage 42 for cylinder when energized, and connects the first pressure chamber 30 to the first transverse supply passage 44 for cylinder when de-energized. The second cylinder solenoid valve 38 connects the second pressure chamber 32 to the second transverse supply passage 46 for cylinder when energized, and connects the second pressure chamber 32 to the second transverse exhaust passage 48 for cylinder when de-energized. The ejector solenoid valve 40 connects the third pressure chamber 34 to the transverse supply passage 50 for ejector when energized, and connects the third pressure chamber 34 to the transverse exhaust passage 52 for ejector when de-energized.

The lower cylinder tube 18 includes a first insertion hole 56a and a second insertion hole 56b positioned between the first transverse supply passage 44 for cylinder and the second transverse supply passage 46 for cylinder. The first insertion hole 56a and the second insertion hole 56b penetrate across the side wall of the lower cylinder tube 18, and both ends of each hole are open to the outside.

The upper cylinder tube 16 includes a third insertion hole 56c positioned below the transverse supply passage 50 for ejector. The third insertion hole 56c penetrates across the side wall of the upper cylinder tube 16, and both ends thereof are open to the outer surface of the upper cylinder tube 16. Together with the first transverse exhaust passage 42 for cylinder and the like described above, the first insertion hole 56a, the second insertion hole 56b, and the third insertion hole 56c extend in a direction perpendicular to the longitudinal direction of the cylinder tube 14, and are arranged in parallel to each other in the up-down direction.

The ejector body 82 is attached to the end portion of the lower rod 28 that protrudes downward from the lower cylinder tube 18. When air is supplied into the ejector body 82 from the third pressure chamber 34 via the upper rod hole 26a and the lower rod hole 28a, the air passes through a nozzle (not shown) in the ejector body 82 and is discharged to the outside. At this time, vacuum pressure (negative pressure) is generated in the suction pad 84 by the air in the suction pad 84 being sucked.

Next, the configuration of the first flow path block 58 will be described. Note that the second flow path block 60 has the same structure as the first flow path block 58, and description of the configuration of the second flow path block 60 will be omitted.

As shown in FIG. 4, the first flow path block 58 includes a supply passage 62 for ejector, a supply passage 64 for cylinder, and a common exhaust passage 66. The supply passage 62 for ejector is formed of a lateral supply flow path 62a for ejector that is connected to the transverse supply passage 50 for ejector of the vacuum suction cylinder 12A and extends in the lateral direction, and a vertical supply flow path 62b for ejector that communicates with the lateral supply flow path 62a for ejector and extends toward the upper surface of the first flow path block 58.

The supply passage 64 for cylinder is formed of a first lateral supply flow path 64a for cylinder, a second lateral supply flow path 64b for cylinder, and a vertical supply flow path 64c for cylinder. The first lateral supply flow path 64a for cylinder is connected to the first transverse supply passage 44 for cylinder of the vacuum suction cylinder 12A and extends in the lateral direction. The second lateral supply flow path 64b for cylinder is connected to the second transverse supply passage 46 for cylinder of the vacuum suction cylinder 12A and extends in the lateral direction. The vertical supply flow path 64c for cylinder communicates with the first lateral supply flow path 64a for cylinder and the second lateral supply flow path 64b for cylinder, and extends toward the upper surface of the first flow path block 58.

The common exhaust passage 66 is formed of a first lateral exhaust flow path 66a for cylinder, a second lateral exhaust flow path 66b for cylinder, a lateral exhaust flow path 66c for ejector, and a vertical exhaust flow path 66d. The first lateral exhaust flow path 66a for cylinder is connected to the first transverse exhaust passage 42 for cylinder of the vacuum suction cylinder 12A and extends in the lateral direction. The second lateral exhaust flow path 66b for cylinder is connected to the second transverse exhaust passage 48 for cylinder of the vacuum suction cylinder 12A and extends in the lateral direction. The lateral exhaust flow path 66c for ejector is connected to the lateral transverse exhaust passage 52 for ejector of the vacuum suction cylinder 12A and extends in the lateral direction. The vertical exhaust flow path 66d communicates with the first lateral exhaust flow path 66a for cylinder, the second lateral exhaust flow path 66b for cylinder, and the lateral exhaust flow path 66c for ejector, and extends toward the upper surface of the first flow path block 58.

The upper surface of the first flow path block 58 is provided with: an ejector supply port 68 connected to the vertical supply flow path 62b for ejector; a cylinder supply port 70 connected to the vertical supply flow path 64c for cylinder; and an exhaust port 72 connected to the vertical exhaust flow path 66d. Air is supplied from an air supply source (not shown) to the ejector supply port 68 and the cylinder supply port 70. The exhaust port 72 is open to the atmosphere.

The first flow path block 58 is provided with a first insertion hole 59a and a second insertion hole 59b positioned between the first lateral supply flow path 64a for cylinder and the second lateral supply flow path 64b for cylinder. The first insertion hole 59a and the second insertion hole 59b penetrate across the first flow path block 58. In addition, the first flow path block 58 is provided with a third insertion hole 59c positioned between the second lateral exhaust flow path 66b for cylinder and the lateral supply flow path 62a for ejector. The third insertion hole 59c penetrates across the first flow path block 58.

Figure 6:
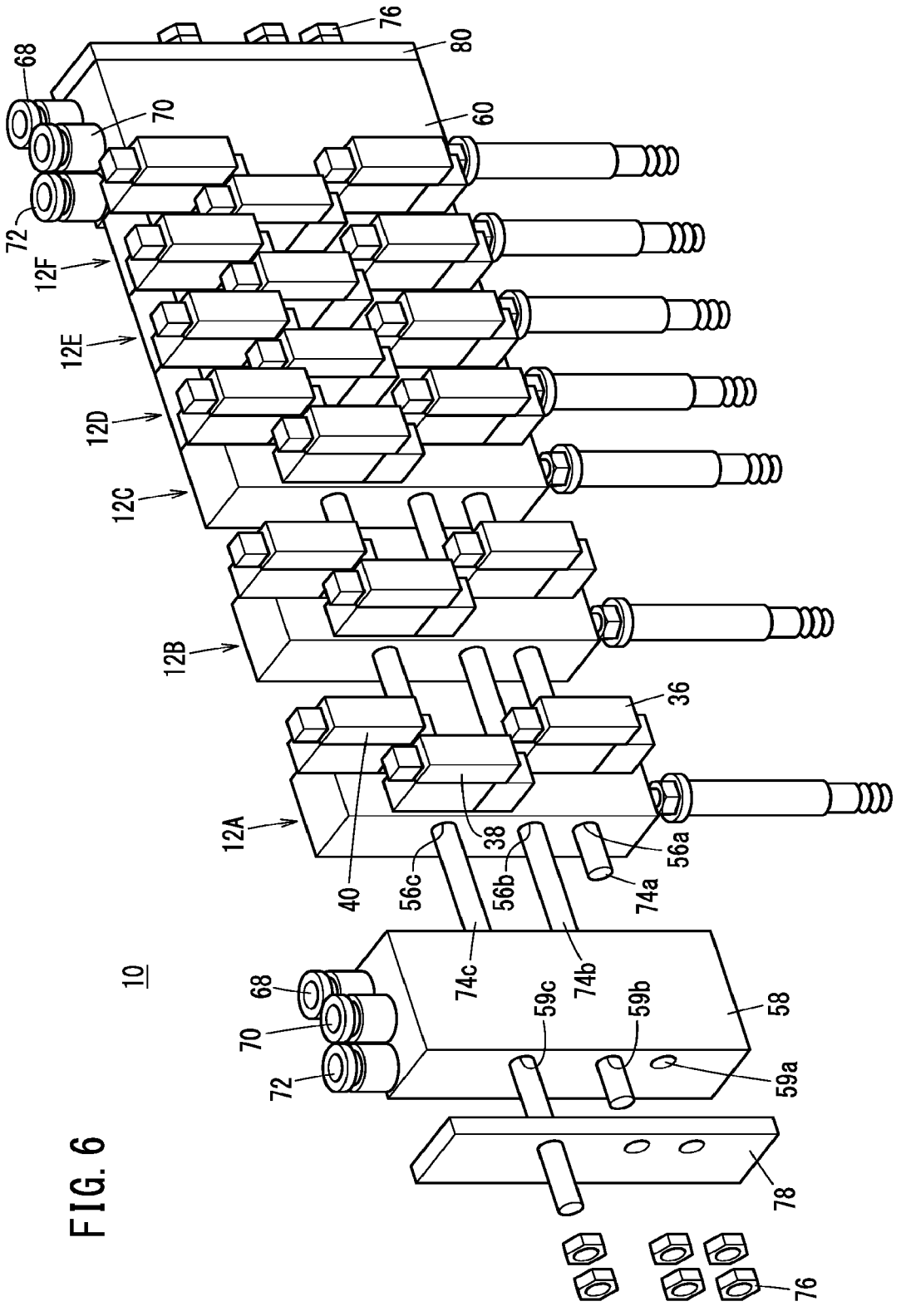
FIG. 6 is a diagram for explaining assembling of the vacuum suction cylinder assembly shown in FIG. 1.

As shown in FIG. 6, the plurality of vacuum suction cylinders 12A to 12F are connected to each other by being sandwiched between the first flow path block 58 and the second flow path block 60 by using first to third tie rods 74a to 74c. The first tie rod 74a is inserted through the first insertion hole 59a of the first flow path block 58, the first insertion holes 56a of the vacuum suction cylinders 12A to 12F, and the first insertion hole 59a of the second flow path block 60, and is fixed by nuts 76 that are screwed onto both ends of the first tie rod 74a.

Similarly, the second tie rod 74b is inserted through the second insertion hole 59b of the first flow path block 58, the second insertion holes 56b of the vacuum suction cylinders 12A to 12F, and the second insertion hole 59*b* of the second flow path block 60, and is fixed by the nuts 76. The third tie rod 74*c* is inserted through the third insertion hole 59*c* of the first flow path block 58, the third insertion holes 56*c* of the vacuum suction cylinders 12A to 12F, and the third insertion hole 59*c* of the second flow path block 60, and is fixed by the nuts 76. In FIG. 6, the transverse supply passages 44, 46, and 50 and the transverse exhaust passages 42, 48, and 52 of the vacuum suction cylinder 12A or the like are omitted. In addition, the lateral supply flow paths 62*a*, 64*a*, and 64*b* and the lateral exhaust flow paths 66*a*, 66*b*, and 66*c* of the first flow path block 58 are also omitted.

A first end plate 78 is disposed outside the first flow path block 58, and a second end plate 80 is disposed outside the second flow path block 60. The first to third tie rods 74*a* to 74*c* are also inserted through the first end plate 78 and the second end plate 80. Seal rings (not shown) are also attached at a predetermined position on the joint surface between the first flow path block 58 and the first end plate 78 and at a predetermined position on the joint surface between the second flow path block 60 and the second end plate 80. However, the first end plate 78 and the second end plate 80 may not be provided.

In the present embodiment, a total of six vacuum suction cylinders 12A to 12F are connected, but an appropriate number of vacuum suction cylinders can be added or removed. In this case, it is preferable that the first to third tie rods 74*a* to 74*c* having different lengths are prepared, and the first to third tie rods 74*a* to 74*c* having appropriate lengths are used according to the number of connected vacuum suction cylinders.

When the plurality of vacuum suction cylinders 12A to 12F are connected to each other, the first transverse exhaust passages 42 for cylinder of the respective vacuum suction cylinders 12A to 12F are aligned in a straight line in the lateral direction and communicate with each other. Similarly, the first transverse supply passages 44 for cylinder, the second transverse supply passages 46 for cylinder, the second transverse exhaust passages 48 for cylinder, the transverse supply passages 50 for ejector, and the transverse exhaust passages 52 for ejector are respectively aligned in a straight line in the lateral direction and communicate with each other.

The first transverse exhaust passage 42 for cylinder of the vacuum suction cylinder 12A is connected to the first lateral exhaust flow path 66*a* for cylinder of the first flow path block 58. The first transverse supply passage 44 for cylinder of the vacuum suction cylinder 12A is connected to the first lateral supply flow path 64*a* for cylinder of the first flow path block 58. The second transverse supply passage 46 for cylinder of the vacuum suction cylinder 12A is connected to the second lateral supply flow path 64*b* for cylinder of the first flow path block 58. The second transverse exhaust passage 48 for cylinder of the vacuum suction cylinder 12A is connected to the second lateral exhaust flow path 66*b* for cylinder of the first flow path block 58. The transverse supply passage 50 for ejector of the vacuum suction cylinder 12A is connected to the lateral supply flow path 62*a* for ejector of the first flow path block 58. The transverse exhaust passage 52 for ejector of the vacuum suction cylinder 12A is connected to the lateral exhaust flow path 66*c* for ejector of the first flow path block 58.

The first transverse exhaust passage 42 for cylinder of the vacuum suction cylinder 12F is connected to the first lateral exhaust flow path 66*a* for cylinder of the second flow path block 60. The first transverse supply passage 44 for cylinder of the vacuum suction cylinder 12F is connected to the first lateral supply flow path 64*a* for cylinder of the second flow path block 60. The second transverse supply passage 46 for cylinder of the vacuum suction cylinder 12F is connected to the second lateral supply flow path 64*b* for cylinder of the second flow path block 60. The second transverse exhaust passage 48 for cylinder of the vacuum suction cylinder 12F is connected to the second lateral exhaust flow path 66*b* for cylinder of the second flow path block 60. The transverse supply passage 50 for ejector of the vacuum suction cylinder 12F is connected to the lateral supply flow path 62*a* for ejector of the second flow path block 60. The transverse exhaust passage 52 for ejector of the vacuum suction cylinder 12F is connected to the lateral exhaust flow path 66*c* for ejector of the second flow path block 60.

Accordingly, air can be simultaneously supplied from both the cylinder supply port 70 of the first flow path block 58 and the cylinder supply port 70 of the second flow path block 60 to the first transverse supply passage 44 for cylinder and the second transverse supply passage 46 for cylinder of each of the vacuum suction cylinders 12A to 12F. In addition, air can be simultaneously supplied from both the ejector supply port 68 of the first flow path block 58 and the ejector supply port 68 of the second flow path block 60 to the transverse supply passage 50 for ejector of each of the vacuum suction cylinders 12A to 12F. Further, the first transverse exhaust passage 42 for cylinder, the second transverse exhaust passage 48 for cylinder, and the transverse exhaust passage 52 for ejector of each of the vacuum suction cylinders 12A to 12F are open to the atmosphere via both the exhaust port 72 of the first flow path block 58 and the exhaust port 72 of the second flow path block 60. As a result, supply and discharge of air to and from the first cylinder solenoid valve 36, the second cylinder solenoid valve 38, and the ejector solenoid valve 40 of each of the vacuum suction cylinders 12A to 12F are performed rapidly, and responsiveness is improved.

The vacuum suction cylinder assembly 10 according to the embodiment of the present invention is basically configured as described above, and the operation thereof will be described below.

For all of the plurality of vacuum suction cylinders 12A to 12F, a state in which energization of the first cylinder solenoid valve 36, the second cylinder solenoid valve 38, and the ejector solenoid valve 40 is stopped is defined as an initial state.

Since the energization of the first cylinder solenoid valve 36 is stopped, the first pressure chamber 30 of each of the vacuum suction cylinders 12A to 12F is connected to the first transverse supply passage 44 for cylinder. Further, since the energization of the second cylinder solenoid valve 38 is stopped, the second pressure chamber 32 of each of the vacuum suction cylinders 12A to 12F is connected to the second transverse exhaust passage 48 for cylinder.

Therefore, air from the cylinder supply port 70 of the first flow path block 58 or the second flow path block 60 is supplied to each first pressure chamber 30 via the supply passage 64 for cylinder, or the like. Further, the air in each second pressure chamber 32 is exhausted from the exhaust port 72 of the first flow path block 58 or the second flow path block 60 via the common exhaust passage 66 or the like. Accordingly, the pistons 24 of the vacuum suction cylinders 12A to 12F are at the raised position, and the suction pads 84 are also held at the raised position.

Since the energization of the ejector solenoid valve 40 is stopped, the third pressure chamber 34 of each of the vacuum suction cylinders 12A to 12F is connected to the transverse exhaust passage 52 for ejector. Therefore, the air in each ejector body 82 is exhausted from the exhaust port 72 of the first flow path block 58 or the second flow path block 60 via the common exhaust passage 66 or the like. Therefore, no vacuum pressure is generated in each suction pad 84.

From the above-described initial state, the first cylinder solenoid valves 36, the second cylinder solenoid valves 38, and the ejector solenoid valves 40 of predetermined vacuum suction cylinders, for example, the vacuum suction cylinders 12A to 12C among the plurality of vacuum suction cylinders 12A to 12F, are energized.

When the first cylinder solenoid valve 36 is energized, the first pressure chamber 30 of each of the vacuum suction cylinders 12A to 12C is connected to the first transverse exhaust passage 42 for cylinder. When the second cylinder solenoid valve 38 is energized, the second pressure chamber 32 of each of the vacuum suction cylinders 12A to 12C is connected to the second transverse supply passage 46 for cylinder.

Accordingly, air from the cylinder supply port 70 of the first flow path block 58 or the second flow path block 60 is supplied to the second pressure chamber 32 of each of the vacuum suction cylinders 12A to 12C via the supply passage 64 for cylinder, or the like. Further, the air in the first pressure chamber 30 of each of the vacuum suction cylinders 12A to 12C is exhausted from the exhaust port 72 of the first flow path block 58 or the second flow path block 60 via the common exhaust passage 66 or the like. As a result, the pistons 24 of the vacuum suction cylinders 12A to 12C are lowered, and the suction pads 84 are also lowered.

When the ejector solenoid valve 40 is energized, the third pressure chamber 34 of each of the vacuum suction cylinders 12A to 12C is connected to the transverse supply passage 50 for ejector. Therefore, the air from the ejector supply port 68 of the first flow path block 58 or the second flow path block 60 is supplied into the ejector body 82 of each of the vacuum suction cylinders 12A to 12C via the supply passage 62 for ejector, or the like. Accordingly, vacuum pressure is generated in the suction pads 84 of the vacuum suction cylinders 12A to 12C.

In this manner, in the vacuum suction cylinders 12A to 12C, since the pistons 24 and the suction pads 84 are lowered and vacuum pressure is generated in the suction pads 84, it is possible to suck workpieces such as tablets (not shown) present below the suction pads 84.

After the vacuum suction cylinders 12A to 12C have sucked the workpieces, the energization of the first cylinder solenoid valve 36 and the second cylinder solenoid valve 38 is stopped while the energization of the ejector solenoid valve 40 is continued in these vacuum suction cylinders 12A to 12C.

By stopping the energization of the first cylinder solenoid valve 36, the first pressure chamber 30 of each of the vacuum suction cylinders 12A to 12C is connected to the first transverse supply passage 44 for cylinder. Further, by stopping the energization of the second cylinder solenoid valve 38, the second pressure chamber 32 of each of the vacuum suction cylinders 12A to 12C is connected to the second transverse exhaust passage 48 for cylinder. As a result, the pistons 24 and the suction pads 84 of the vacuum suction cylinders 12A to 12C rise.

On the other hand, since energization of the ejector solenoid valve 40 is continued, a state in which vacuum pressure is generated in the suction pad 84 of each of the vacuum suction cylinders 12A to 12C is maintained. Then, by operating a robot arm (not shown) in a state where the vacuum suction cylinders 12A to 12C suck and hold the workpieces, the vacuum suction cylinder assembly 10 can be moved to convey the workpieces to a predetermined place.

After the vacuum suction cylinder assembly 10 has moved to the predetermined place, the first cylinder solenoid valve 36 and the second cylinder solenoid valve 38 are energized and energization of the ejector solenoid valve 40 is stopped in the vacuum suction cylinders 12A to 12C.

When the first cylinder solenoid valves 36 and the second cylinder solenoid valves 38 are energized, the pistons 24 of the vacuum suction cylinders 12A to 12C are lowered, and the suction pads 84 are also lowered. In addition, by stopping the energization of the ejector solenoid valves 40, the vacuum pressure generated in the suction pads 84 of the vacuum suction cylinders 12A to 12C disappears. Therefore, the workpieces sucked by the suction pads 84 of the vacuum suction cylinders 12A to 12C are released.

According to the vacuum suction cylinder assembly 10 of the present embodiment, the plurality of vacuum suction cylinders 12A to 12F are sandwiched and connected between the first flow path block 58 and the second flow path block 60 by using the first to third tie rods 74a to 74c. Therefore, it is possible to easily accommodate a request to increase or decrease the number of vacuum suction cylinders.

Moreover, the first cylinder solenoid valve 36, the second cylinder solenoid valve 38, and the ejector solenoid valve 40 are attached to the side surface of the cylinder tube 14. Therefore, the flow paths between the first pressure chamber 30, the second pressure chamber 32 and the third pressure chamber 34, and the corresponding solenoid valves can be made as short as possible.

Further, the first transverse exhaust passage 42 for cylinder, the first transverse supply passage 44 for cylinder, the second transverse supply passage 46 for cylinder, the second transverse exhaust passage 48 for cylinder, the transverse supply passage 50 for ejector, and the transverse exhaust passage 52 for ejector extend in a direction perpendicular to the longitudinal direction of the cylinder tube 14 and are arranged in parallel to each other in the up-down direction. Therefore, it is possible to efficiently arrange a large number of flow paths on the side wall of the cylinder tube 14 while making the flow paths as short as possible.

Furthermore, the ejector body 82 is connected by screwing to the end portion of the lower rod 28 fixed to the piston 24, the end portion extending to the outside. Therefore, the ejector portion can be easily replaced in accordance with the type of workpiece to be sucked, or the like.

In addition, air can be simultaneously supplied from both the first flow path block 58 and the second flow path block 60 to each of the vacuum suction cylinders 12A to 12F, and air can be discharged from each of the vacuum suction cylinders 12A to 12F toward both the first flow path block 58 and the second flow path block 60. Therefore, the supply and discharge of air are performed rapidly, and the responsiveness is improved.

(Modified Example of Vacuum Suction Cylinder)

Figure 7:
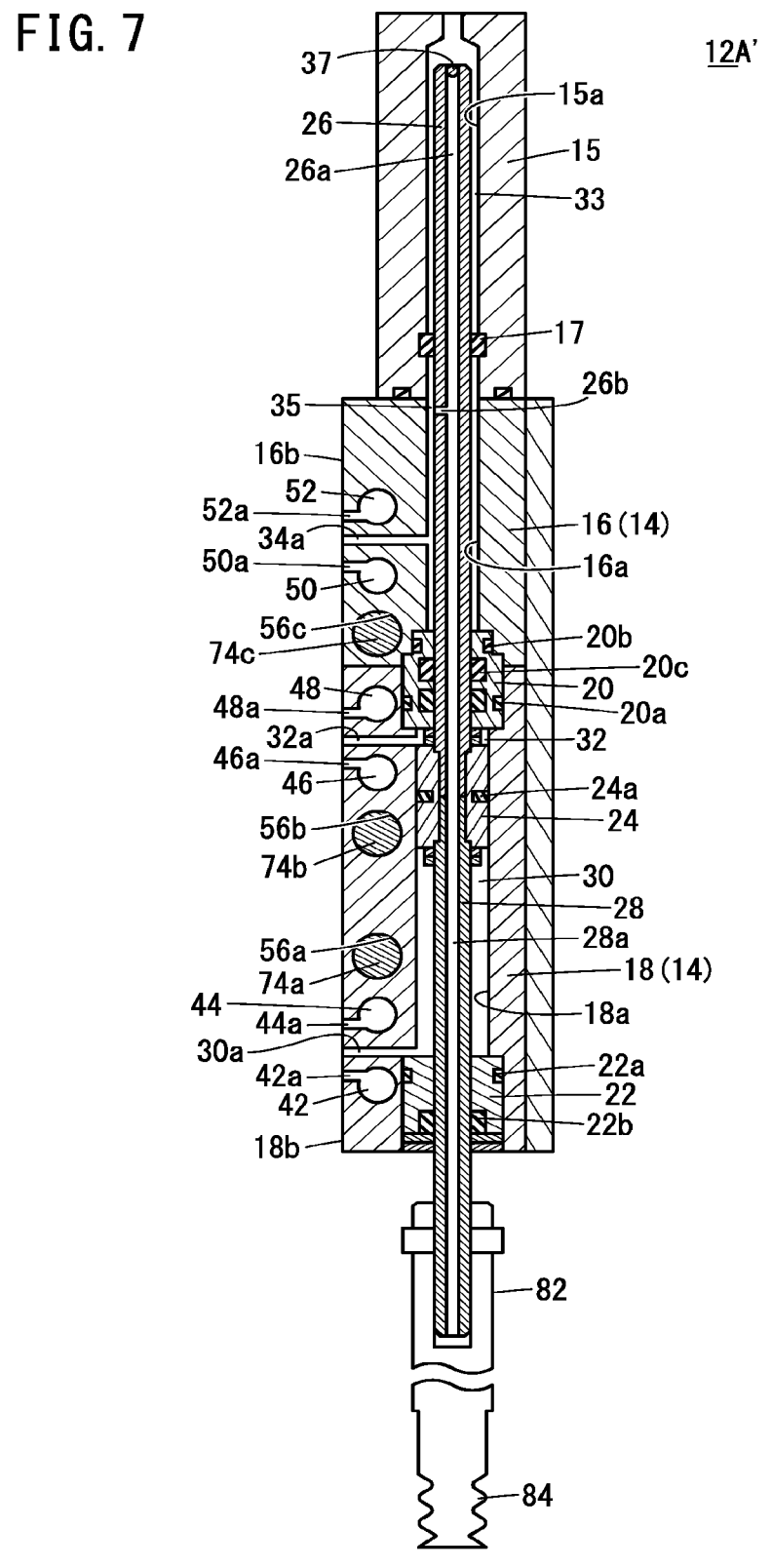

The vacuum suction cylinder 12A described above can be replaced with a vacuum suction cylinder 12A' of the following form. Hereinafter, the vacuum suction cylinder 12A' will be described with reference to FIG. 7. The same components as those of the vacuum suction cylinder 12A are denoted by the same reference numerals.

The vacuum suction cylinder 12A' includes a protective cover 15 attached to the upper side of the upper cylinder tube 16. The upper rod 26 is inserted into the cylinder hole 16a provided as a through hole in the upper cylinder tube 16, and extends into a cover hole 15*a* provided in the protective cover 15. A rod packing 17 in sliding contact with the upper rod 26 is attached to the protective cover 15.

The rod packing 17 comes in sliding contact with the upper rod 26, whereby a gap formed between the upper rod 26 and the wall surface of the cover hole 15*a* is airtightly separated into an upper part and a lower part of the sliding contact location. Since the upper end of the cover hole 15*a* is open to the outside, the upper part forms an open chamber 33 that communicates with the atmosphere. Further, the lower part is integrated with a space formed between the upper rod 26 and the wall surface of the cylinder hole 16*a* of the upper cylinder tube 16 to form an ejector pressure chamber 35.

The third passage 34*a* provided in the upper cylinder tube 16 communicates with the ejector pressure chamber 35. The side wall of the upper rod 26 includes a lateral hole 26*b* for allowing the ejector pressure chamber 35 to communicate with the upper rod hole 26*a*. Further, a seal portion 37 for airtightly separating the upper rod hole 26*a* from the open chamber 33 is attached to the upper end of the upper rod 26.

Therefore, the ejector pressure chamber 35 communicates with the interior of the ejector body 82 via the lateral hole 26*b*, the upper rod hole 26*a*, and the lower rod hole 28*a*, and functions as a charge chamber for air to be supplied to the ejector portion. In this case, since the air in the ejector pressure chamber 35 is introduced into the upper rod hole 26*a* through the lateral hole 26*b* provided in the side wall of the upper rod 26, the air pressure in the ejector pressure chamber 35 does not act in a direction to push down the upper rod 26.

When the ejector solenoid valve 40 is energized, the ejector pressure chamber 35 of the vacuum suction cylinder 12A' is connected to the transverse supply passage 50 for ejector. Therefore, the air from the ejector supply port 68 of the first flow path block 58 or the second flow path block 60 is supplied into the ejector body 82 of the vacuum suction cylinder 12A' via the supply passage 62 for ejector, or the like. As a result, vacuum pressure is generated in the suction pad 84 of the vacuum suction cylinder 12A'.

The vacuum suction cylinder assembly according to the present invention is not limited to the above-described embodiments, and it goes without saying that various configurations may be adopted therein without departing from the gist of the present invention.

The invention claimed is:

1. A vacuum suction cylinder assembly comprising a plurality of vacuum suction cylinders connected in a predetermined direction, wherein the plurality of vacuum suction cylinders are connected to each other by being sandwiched between a first flow path block and a second flow path block by using tie rods respectively inserted through insertion holes penetrating a side wall of a cylinder tube of each of the vacuum suction cylinders, insertion holes provided in the first flow path block, and insertion holes provided in the second flow path block, wherein each of the vacuum suction cylinders includes: a first pressure chamber and a second pressure chamber defined by a piston; and a third pressure chamber or an ejector pressure chamber communicating with a rod hole provided inside a rod fixed to the piston, and wherein an ejector body is connected to an end portion of the rod that extends to an outside.

2. The vacuum suction cylinder assembly according to claim 1, wherein each of the vacuum suction cylinders includes: a first cylinder solenoid valve configured to switch between supply and discharge of air to and from the first pressure chamber; a second cylinder solenoid valve configured to switch between supply and discharge of air to and from the second pressure chamber; and an ejector solenoid valve configured to switch between supply and discharge of air to and from the third pressure chamber.

3. The vacuum suction cylinder assembly according to claim 2, wherein the first cylinder solenoid valve, the second cylinder solenoid valve, and the ejector solenoid valve are attached to a side surface of the cylinder tube of each of the vacuum suction cylinders.

4. The vacuum suction cylinder assembly according to claim 2, wherein the side wall of the cylinder tube of each of the vacuum suction cylinders includes: a first transverse exhaust passage for cylinder and a first transverse supply passage for cylinder that are connected to the first cylinder solenoid valve; a second transverse supply passage for cylinder and a second transverse exhaust passage for cylinder that are connected to the second cylinder solenoid valve; and a transverse supply passage for ejector and a transverse exhaust passage for ejector that are connected to the ejector solenoid valve.

5. The vacuum suction cylinder assembly according to claim 4, wherein the first transverse exhaust passage for cylinder, the first transverse supply passage for cylinder, the second transverse supply passage for cylinder, the second transverse exhaust passage for cylinder, the transverse supply passage for ejector, and the transverse exhaust passage for ejector extend in a direction perpendicular to a longitudinal direction of the cylinder tube, and are arranged in parallel to each other in a direction parallel to an axis of the cylinder tube.

6. The vacuum suction cylinder assembly according to claim 4, wherein the first flow path block and the second flow path block each include a supply passage for ejector, a supply passage for cylinder, and a common exhaust passage.

7. The vacuum suction cylinder assembly according to claim 6, wherein the supply passage for ejector is formed of: a lateral supply flow path for ejector that is connected to the transverse supply passage for ejector of each of the vacuum suction cylinders, and a vertical supply flow path for ejector that communicates with the lateral supply flow path for ejector, the supply passage for cylinder is formed of: a first lateral supply flow path for cylinder that is connected to the first transverse supply passage for cylinder of each of the vacuum suction cylinders; a second lateral supply flow path for cylinder that is connected to the second transverse supply passage for cylinder of each of the vacuum suction cylinders; and a vertical supply flow path for cylinder that communicates with the first lateral supply flow path for cylinder and the second lateral supply flow path for cylinder, and the common exhaust passage is formed of: a first lateral exhaust flow path for cylinder that is connected to the first transverse exhaust passage for cylinder of each of the vacuum suction cylinders; a second lateral exhaust flow path for cylinder that is connected to the second transverse exhaust passage for cylinder of each of the vacuum suction cylinders; a lateral exhaust flow path for ejector that is connected to the transverse exhaust passage for ejector of each of the vacuum suction cylinders; and a vertical exhaust flow path that communicates with the first lateral exhaust flow path for cylinder, the second lateral exhaust flow path for cylinder, and the lateral exhaust flow path for ejector.

8. The vacuum suction cylinder assembly according to claim 7, wherein a predetermined surface of each of the first flow path block and the second flow path block includes an ejector supply port connected to the vertical supply flow path for ejector of the supply passage for ejector, a cylinder supply port connected to the vertical supply flow path for cylinder of the supply passage for cylinder, and an exhaust port connected to the vertical exhaust flow path of the common exhaust passage.

9. The vacuum suction cylinder assembly according to claim 1, wherein air in the ejector pressure chamber is introduced into the rod hole through a lateral hole provided in a side wall of the rod.

* * * * *